(12) United States Patent
Liang et al.

(10) Patent No.: US 10,922,529 B2
(45) Date of Patent: Feb. 16, 2021

(54) HUMAN FACE AUTHENTICATION METHOD AND APPARATUS, AND STORAGE MEDIUM

(71) Applicant: Tencent Technology (Shenzhen) Company Limited, Shenzhen (CN)

(72) Inventors: Yicong Liang, Shenzhen (CN); Jilin Li, Shenzhen (CN); Chengjie Wang, Shenzhen (CN); Shouhong Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 331 days.

(21) Appl. No.: 16/208,183

(22) Filed: Dec. 3, 2018

(65) Prior Publication Data

US 2019/0114467 A1    Apr. 18, 2019

Related U.S. Application Data

(63) Continuation-in-part of application No. PCT/CN2017/100070, filed on Aug. 31, 2017.

(30) Foreign Application Priority Data

Aug. 31, 2016    (CN) .......................... 201610796542.3

(51) Int. Cl.
*G06K 9/00*    (2006.01)
*G06K 9/32*    (2006.01)
(Continued)

(52) U.S. Cl.
CPC ......... *G06K 9/00234* (2013.01); *G06F 21/32* (2013.01); *G06K 9/00281* (2013.01);
(Continued)

(58) Field of Classification Search
USPC ....................................................... 382/118
See application file for complete search history.

(56) References Cited

U.S. PATENT DOCUMENTS 7,391,900 B2 *  6/2008  Kim ................... G06K 9/00228
                                                    382/118
7,653,221 B2 *  1/2010  Gu ..................... G06K 9/00281
                                                    382/118
(Continued)

FOREIGN PATENT DOCUMENTS

CN    103914686 A    7/2014
CN    104156700 A    11/2014
CN    106407912 A    2/2017

OTHER PUBLICATIONS

Tencent Technology, ISRWO, PCT/CN2017/100070, dated Dec. 7, 2017, 7 pgs.
(Continued)

*Primary Examiner* — Ishrat I Sherali
(74) *Attorney, Agent, or Firm* — Morgan, Lewis & Bockius LLP

(57) ABSTRACT

A device receives an image-based authentication request from a specified object and performs human face authentication in a manner depending on whether the object wears glasses. Specifically, the device designates a glasses region on a daily photograph of the specified object using a glasses segmentation model. If the regions of the human face in the daily photograph labeled as glasses exceed a first threshold amount, the device modifies the daily photograph by changing pixel values of the regions that are labeled as being obscured by glasses. The device extracts features of a daily human face from the daily photograph and features of an identification human face from the identification photograph. The device approves the authentication request if a matching degree between the features of the daily human (Continued)

face and the features of the identification human face is greater than a second threshold amount.

20 Claims, 7 Drawing Sheets

(51) Int. Cl.
    *G06N 3/04*         (2006.01)
    *G06K 9/46*         (2006.01)
    *G06K 9/62*         (2006.01)
    *G06T 7/11*         (2017.01)
    *G06F 21/32*       (2013.01)
    *G06N 3/08*         (2006.01)
    *G06T 5/00*         (2006.01)

(52) U.S. Cl.
    CPC ....... *G06K 9/00288* (2013.01); *G06K 9/3233* (2013.01); *G06K 9/4628* (2013.01); *G06K 9/6202* (2013.01); *G06K 9/627* (2013.01); *G06N 3/04* (2013.01); *G06N 3/0454* (2013.01); *G06N 3/08* (2013.01); *G06T 5/005* (2013.01); *G06T 7/11* (2017.01); *G06K 9/6256* (2013.01); *G06T 2207/20081* (2013.01); *G06T 2207/20084* (2013.01); *G06T 2207/30201* (2013.01)

(56) References Cited

U.S. PATENT DOCUMENTS

| | | | | |
|---|---|---|---|---|
| 8,515,127 B2* | 8/2013 | Brown | ............... | G06K 9/4614 382/103 |
| 10,769,499 B2* | 9/2020 | Zhang | ............... | G06K 9/6256 |
| 2005/0105780 A1* | 5/2005 | Ioffe | ............... | G06K 9/6296 382/118 |
| 2006/0193515 A1* | 8/2006 | Kim | ............... | G06K 9/00228 382/173 |
| 2007/0177793 A1* | 8/2007 | Gu | ............... | G06K 9/00281 382/159 |
| 2016/0203305 A1* | 7/2016 | Suh | ............... | G06F 21/32 382/118 |
| 2018/0096537 A1* | 4/2018 | Kornilov | ............... | G06K 9/00228 |
| 2018/0285630 A1* | 10/2018 | Han | ............... | G06K 9/2054 |
| 2019/0050632 A1* | 2/2019 | Weng | ............... | G06K 9/00288 |
| 2020/0372243 A1* | 11/2020 | Tai | ............... | G06K 9/00281 |

OTHER PUBLICATIONS

Tencent Technology, IPRP, PCT/CN2017/100070, dated Mar. 5, 2019, 6 pgs.

* cited by examiner

HUMAN FACE AUTHENTICATION METHOD AND APPARATUS, AND STORAGE MEDIUM

PRIORITY CLAIMS AND RELATED APPLICATIONS

This application is a continuation-in-part application of PCT application number PCT/CN2017/100070, entitled "HUMAN FACE AUTHENTICATION METHOD AND APPARATUS, AND STORAGE MEDIUM", filed on Aug. 31, 2017, which claims priority to Chinese Patent Application No. 201610796542.3, filed with the State Intellectual Property Office of the People's Republic of China on Aug. 31, 2016, and entitled "HUMAN FACE AUTHENTICATION METHOD AND APPARATUS, AND STORAGE MEDIUM", all of which are incorporated herein by reference in their entirety.

FIELD OF THE TECHNOLOGY

This application relates to the field of machine identification technologies, and specifically, to a human face authentication method and apparatus, and a storage medium.

BACKGROUND OF THE DISCLOSURE

A human face authentication algorithm can fully automatically authenticate two human face photographs to determine whether the two photographs are photographs of a same person. This manner may be used for identity checking of a user human face in many scenarios such as Internet finance. A process of the identity checking is mainly to compare an identification photograph of a user with a photograph of the user captured by a camera at the scene, so as to determine whether the two photographs are photographs of a same person by comparing features of the two photographs.

In recent years, a growing number of people become near-sighted. In addition, as an accessory attribute of glasses is continuously strengthened, more users wear glasses as an accessory. However, during a process of capturing an official identification photograph, glasses need to be removed. Therefore, it is of more significant meaning to accurately determine whether a photograph of a person with glasses and an identification photograph of a person without glasses are photographs of the same person.

SUMMARY

In the conventional technology for matching photos of people with glasses and photos of people without glasses, the following methods are used:

Method 1: Directly train the face verification algorithm using the ID face image (e.g., an example of the identification photographs) and the self-portrait face image (e.g., an example of the daily photographs referred to in this disclosure) without distinguishing whether glasses are worn by the subjects in the images. High dimensional feature extractions and deep convolutional neural networks are used to perform the feature extraction and matching, however, because the training samples with glasses and without glasses are mixed, the learning is not very accurate and the verification results are of low accuracy irrespective the amount of training samples that are provided to the verification models. Thus, the face verification algorithm obtained by using the method 1 cannot effectively extract the features of the occluded part due to the occlusion of the face area by the ophthalmic glasses, and is ineffective in the verification process of the self-photographs of the glasses.

Method 2: Using pairs of a face image of an ID card and a corresponding self-portrait face image with glasses to train a dedicated face verification algorithm. Using this method, it is difficult to obtain sufficient amount of training samples. For example, the photograph conditions, and the styles of glasses are so varied. Using the face verification algorithm obtained by the method 2, due to the diversity of the glasses themselves, it is difficult for the training sample to cover various glasses, resulting in poor verification results.

Method 3: Using the glasses removal technology to restore an image of the subjects without glasses from the self-portrait face image of the subjects with glasses, and then use the universal face authentication algorithm to perform the verification against identification photos of people. The face verification algorithm obtained by using the method 3, for the special glasses removal algorithm, because it needs to rely on other people's non-glasses photos, it will destroy the identity information contained in the face photo and affect the face verification effect. For the general image blocking algorithms, experiments show that it has a good removal effect on thin-frame glasses, but it is difficult for photos with thick-rimmed glasses to truly recover the face area covered by the glasses, so even though the verification effect is improved compared to the universal face verification algorithm (e.g., method 1), but the improvement is not significant.

Thus, the existing face verification algorithms are not effective in the verification process using identification photographs (without glasses) and self-portrait photographs (possibly with glasses). The embodiments disclosed herein effectively improves the judgment accuracy rate of the algorithm in the verification process by integrating a glasses segmentation algorithm, a glasses photo feature regression network, and other novel features.

To resolve a problem that an identification photograph cannot be effectively compared with a photograph with glasses in the existing technology, embodiments of this application provide a human face authentication method, which can effectively compare an identification photograph of a person with a photograph of a person with glasses (e.g., a self-portrait or other daily photographs of the person posted on social media or captured by surveillance cameras) and improves convenience of human face authentication. The embodiments of this application further provide a corresponding apparatus and a storage medium.

In one aspect, a method of human face authentication is performed at a device having one or more processors and memory. The device receives an image-based authentication request from a specified object for a respective transaction, the specified object being a human user. In response to receiving the image-based authentication request, the device performs the human face authentication in a manner depending on whether the person wears glasses. Specifically, the device obtains an identification photograph of a specified object and a daily photograph of the specified object. The identification photograph of the specified object and the daily photograph of the specified object each include a region corresponding to a human face of the human user. The device designates a glasses region on the daily photograph of the specified object by using a glasses segmentation model. The glasses segmentation model has been trained to label pixels in the daily photograph that correspond to regions of the human face in the daily photograph that are obscured by glasses. In accordance with a determination that the regions of the human face in the daily photograph that are labeled as being obscured by glasses exceed a first threshold amount, the device modifies the daily photograph by changing pixel values of the regions of the human face in the daily photograph that are labeled as being obscured by glasses. In accordance with a determination that the regions of the human face in the daily photograph that are labeled as being obscured by glasses do not exceed the first threshold amount, the device forgoes modifying the daily photograph by changing the pixel values of the regions of the human face in the daily photograph that are labeled as being obscured by glasses. The device extracts features of a daily human face from the daily photograph of the specified object and features of an identification human face from the identification photograph of the specified object by using a respective authentication model depending on whether the daily photograph has been modified. If the daily photograph has not been modified, the device extracts the features from both the identification photograph and the daily photograph using the same authentication model. Otherwise, the device extracts the features from the identification photograph using the authentication model, and extracts the features from the daily photograph using an adjusted authentication model for photos with glasses. The device approves the authentication request in accordance with a determination that a matching degree between the features of the daily human face and the features of the identification human face is greater than a second threshold amount. Otherwise, the device rejects the authentication request.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

Compared with the problem that an identification photograph cannot be effectively compared with a photograph with glasses in the existing technology, an embodiment of this application provides a human face authentication method. A corresponding feature or features of a human face may be extracted from a photograph of a human face wearing glasses by using a corresponding authentication model, and be compared with a feature of features of a human face in an identification photograph (without glasses), thereby effectively comparing an identification photograph of a person with a photograph of a person with glasses and improving the effectiveness, speed, and accuracy of human face authentication.

BRIEF DESCRIPTION OF THE DRAWINGS

To describe the technical solutions of embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

An of this application provides a human face authentication method, which can effectively compare an identification photograph with a photograph with glasses and improves convenience of human face authentication. An embodiment of this application further provides a corresponding apparatus. Details descriptions are separately provided below.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person skilled in the art based on the embodiments of this application without creative efforts shall fall within the protection scope of this application.

An identification photograph in the embodiments of this application may be a photograph that is used for proving an identity and that is on various identifications, for example, a photograph on an identity card, a photograph on a social security card, a photograph on a passport, a photograph on a driving license, or a photograph on a pass.

A specified object may be a person requests a business in various business scenarios, in other words, a person who produces the identification (e.g., ID card with an identification photograph of the person not wearing glasses).

In real life, in many scenarios, for example, requesting a financial business, doing a security check at an airport, and passing through customs, a photograph on an identification needs to be checked to determine whether the photograph is a photograph of a same person. In real life, the check is performed by eyes of staff. This is extremely labor-consuming. In addition, photographs on identifications are without glasses, but in real life, many people are near-sighted and many people enjoy wearing glasses as an accessory. Consequently, in various scenarios, it is quite difficult for staff to quickly authenticate whether a photograph on an identification is a photograph of a same person. Therefore, it is of significant meaning if authentication can be performed on an identification photograph and the person produces the identification photograph by a machine.

Figure 1:
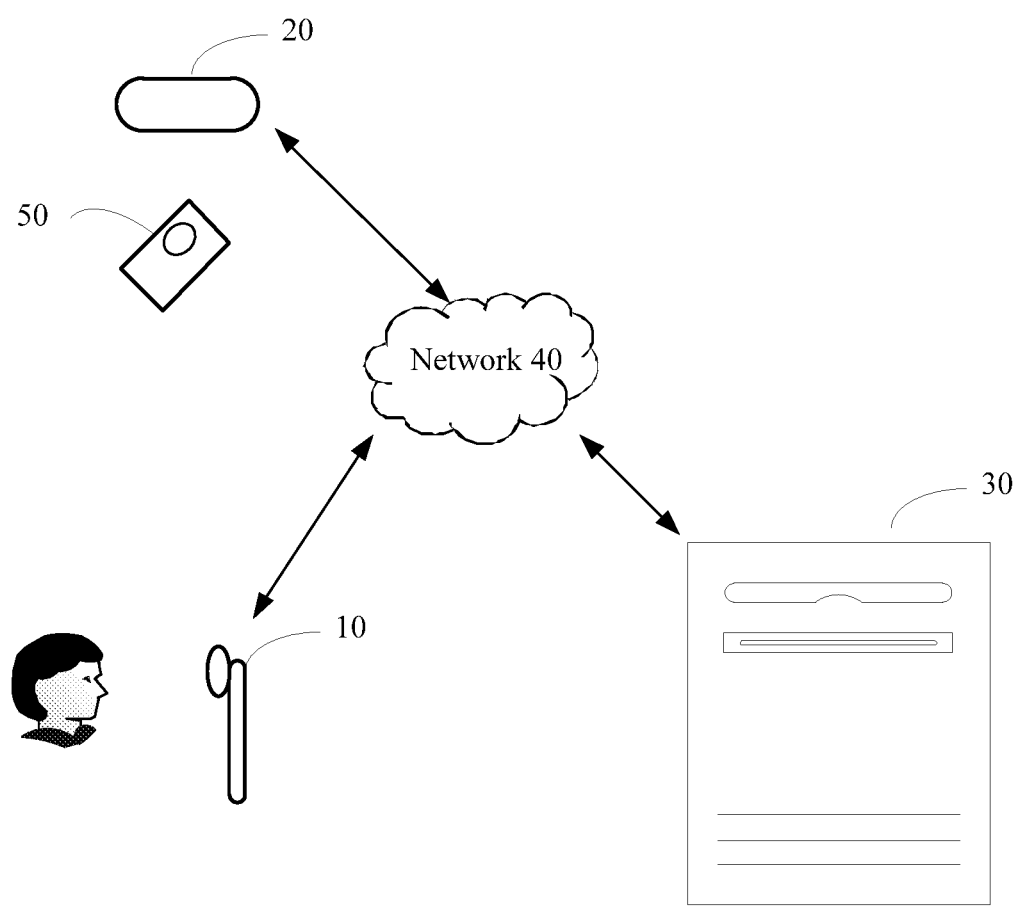
FIG. 1 is a schematic diagram of an embodiment of a human face authentication system according to an embodiment of this application.

Therefore, an embodiment of this application provides a human face authentication system. As shown in FIG. 1, the human face authentication system includes a first image collector 10 (e.g., a camera on a computer, a web camera, a camera on a mobile device, a camera on a kiosk, etc.), a second image collector 20 (e.g., a scanner or camera), a server 30, and a network 40. Both the first image collector 10 and the second image collector 20 may be cameras. The first image collector 10 is configured to collect a human face image of a person showing an identification. That is, a current photograph of the person is captured in real-time. The second image collector 20 is configured to collect an identification photograph on an identification 50 (e.g., an ID card, a passport, etc.). Subsequently, the first image collector 10 and the second image collector 20 send the current photograph and the identification photograph of the person to the server 30 by using the network 40. The server 30 performs authentication on the current photograph and the identification photograph of the person. The server 30 performs the authentication by using the current photograph of the person as a daily photograph of a specified object, and using the identification photograph of the person as an identification photograph of the specified object. Certainly, the first image collector 10 may alternatively collect the identification photograph on the identification, and the second image collector 20 may alternatively photograph the current photograph of the person. Specific use of the first image collector 10 and the second image collector 20 is not limited by this embodiment of this application.

In some embodiments, in a real-time transaction authentication scenario (e.g., passing security check, or executing financial transactions, or requesting other restricted transactions), the collection of photographs by the first and second image collectors are required to be performed substantially at the same time and at the same location. The photographs collected at the first and second collectors are not compared by the server (e.g., the server returns an error message), if the server determines that the collection time (and/or collection location) of the photographs are different by more than a threshold amount of time (e.g., more than 5 minutes) (and/or a threshold amount of distance (e.g., more than 5 meters)).

In some embodiments, photographs of a person captured by surveillance cameras in their daily lives, or photographs of a person that is uploaded to social media websites, and published by news media, are compared to identification photographs stored in government databases or obtained by law enforcement, for investigative or identification purposes. The methods disclosed herein are applicable to these offline comparison purposes as well. In such usage scenarios, the server does not require the image collection time and location to be matched between the first image collector and the second image collector.

In some embodiments, the basic principle of the technical solution for improving authentication verification accuracy, efficiency, and effectiveness includes:

1. Photos of subjects wearing glasses will cause a certain proportion of the face areas in the photos to be blocked by the glasses, so that the conventional face verification algorithm cannot extract the face features of the occluded areas, resulting in reduction in salient data information in the photos for facial image comparison, and mixing of feature data from photos with glasses and photos without glasses, and resulting in poor performance of the models, and an unsatisfactory result of face verification.

2. Using the glasses segmentation algorithm as described herein to accurately segment the area covered by the glasses on the face of the glasses, such that these regions are treated specially, rather than muddling the model feature learning in the facial region in the eye area of the face.

3. Adjust the conventional face verification model with the aid of the above segmentation result, so that the algorithm model uses only the regions that are not occluded by the eyeglasses to extract features, and make it as close as possible to the features extracted from the non-spectacles photo on the regular model. The adjusted model can achieve better face verification.

Figure 6:
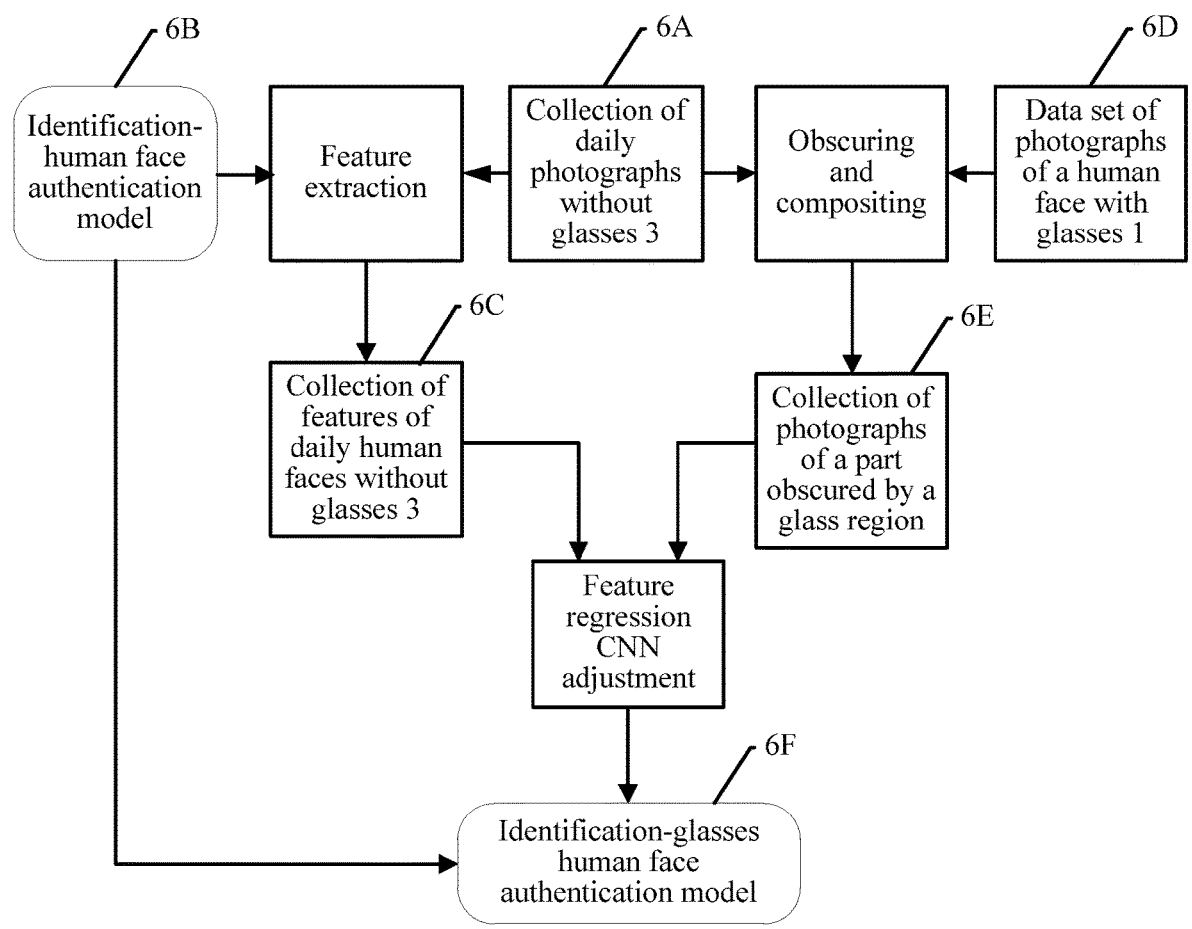
FIG. 6 is another schematic diagram of a process of generating an identification-glasses human face authentication model according to an embodiment of this application.

In some embodiments, a computing device (e.g., a server) performs the face verification using four different modules to perform operations in several stages (see also FIG. 6, and accompanying descriptions).

Module 1: "spectacular segmentation" model generation process:

Step 1.1: Collect self-portrait face images of people wearing glasses, and build "self-portrait face photo data set 1." In this step, the self-portrait face images can be submitted by users voluntarily through a portal provided by the server, or based on correlation between people's names, their non-ID photographs (e.g., photos uploaded to social media), and their self-designation as people wearing glasses (e.g., information from government databases, or biographical self-descriptions).

Step 1.2: Manually and accurately mark the area covered by the glasses for each face of the "self-portrait face photo data set 1". These areas include (1) areas that are obscured by opaque parts such as frames, frames, and nose pads. (2). The area of strong reflection caused by the lens. (Note: The areas behind the transparent part of the lens is not included in the occlusion area.) "The self-portrait face image dataset 1" and the corresponding occlusion areas in all the images and their corresponding labels together constitute the "labeled self-portrait face photo data set 1". In some embodiments, in order to facilitate the manual marking, the server provides preset shapes that is adjustable in size, shape, and thickness, which can be presented concurrently with each photo, and can be dragged by the user onto an area of the photo to cover the area of the glasses in the photo, and the server records the location and final shape of the adjusted preset shape on the photo as the location and shape of the occlusion area of the photo and the corresponding label that is automatically generated for the photo.

Step 1.3: The glasses segmentation CNN network training is performed by using the "labeled self-portrait face photo data set 1" to obtain a "glasses segmentation" model. The eyeglass segmentation CNN network includes convolution layer, batch normalization layer, deconvolution layer, etc. The training optimization goal is to minimize the number of false pixel identification in the segmentation result compared with the annotation result. For example, in the labeled self-portrait face photo data set 1", each pixel of the photo is either labeled as an occlusions area blocked by glasses, or a non-occlusion area not blocked by glasses, and the training of the glasses segmentation model training is performed to minimize misidentification of the photo pixels as occluded or not occluded in comparison to the labeled data set 1.

Module 2: "ID card face vs. self-portrait face" verification model generation process (see also FIG. 4 and accompanying descriptions).

Step 2.1: Collect self-portrait faces and build "self-portrait face photo data set 2". These photos can be collected through portals of the server with permission of the user to collect their ID photos, or these can be photos that are previously submitted photos for comparison and verification (e.g., history verification requests collected before, with correct pairing verification results). These photos do not necessarily include glasses or not include glasses.

Step 2.2: Collect the ID face image of the person corresponding to the identity of each of the self-portrait face in the "self-portrait face image data set 2" and construct the "ID card face image data set 1".

Step 2.3: Face authentication CNN network training is performed using "ID card face image data set 1" and "self-portrait face image dataset 2" to obtain the "ID card face vs self-portrait face" verification model.

Module 3: "ID card face vs. self-portrait face with glasses" verification model generation process (see also FIG. 5 and accompanying descriptions).

Step 3.1: Collecting self-portrait face images without glasses, and constructing a "glasses-free self-portrait face photo data set 3".

Step 3.2: Using the "ID card face vs. self-portrait face" verification model obtained in step 2.3, extract the face features for each photo in the "glasses-free self-portrait face photo data set 3" to obtain "glasses-free self-portrait face feature dataset 3".

Step 3.3: For each face A in the "glasses-free self-portrait face photo data set 3", find a face photo B in the "self-portrait face photo data set 1" of which the regions of the eyes in the photos A and B are sufficiently close in accordance with a preset threshold offset distance. The region with glasses in photo B is manually marked as region C, and the pixels at the positions of region C in photo A are set as pixels with a pure grayscale pixel value 128 (e.g., black or white). This is the occlusion operation that is to be performed on each photo in the "glasses-free self-portrait face image data set 3. When all the photos in the "glasses-free self-portrait face photo data set 3" are subjected to the occlusion synthesis operation as above, the "glasses-free self-portrait occlusion photo data set 3" is obtained.

Step 3.4: Using the "glasses-free self-portrait occlusion photo dataset 3" and the "glass-free self-portrait face feature dataset 3" to perform a "feature regression-based CNN network" adjustment on the "ID card face vs. self-portrait face" verification model obtained in step 2.3. This feature regression CNN network adjustment enables the verification model to minimize the Euclidean distances of the corresponding features in images in the "glasses-free self-portrait occlusion image data set 3" and in images in the "glasses-free self-portrait face feature data set 3". After the feature regression CNN network adjustment, the "ID card face vs. self-portrait face (with glasses)" verification model was obtained.

Module 4: "ID card face—glasses self-portrait face" verification process (see also FIG. 7, and accompanying descriptions).

Step 4.1: Using the "glasses segmentation model" obtained in step 1.3, perform a glasses segmentation operation on an inputted "self-portrait face photo" of a specified subject. If the segmentation result indicates that the area covered by the glasses is less than a certain threshold amount, it means that the "self-portrait face photo" does not include glasses, and at this time, the device enters into the general "ID card face vs. self-portrait face" verification process. If the segmentation result indicates that the area of the occluded area of the glasses is greater than a certain threshold amount (e.g., 5% of the overall area of the face), the process proceeds to step 4.2.

Step 4.2: Set the pixel value of the occlusion region indicated by the segmentation result as the grayscale pixel of gray value 128, and obtain "self-portrait glasses occlusion photo".

Step 4.3: Using the "ID face vs. self-portrait face" verification model obtained in step 3.4 to perform feature extraction on the "self-portrait occlusion photo" obtained in 4.2 to obtain "glasses-free self-portrait face features".

Step 4.4: Using the "ID face vs. self-portrait face" verification model obtained in step 2.3 to extract features from the inputted "ID face picture" to obtain "ID card face features".

Step 4.4: Calculate the similarity between the "ID card face features" and the "glasses-free self-portrait face features." Similarity can be calculated using Euclidean distance, cos distance, or using a more advanced joint Bayesian method or metric learning.

Step 4.5: The final verification result is obtained by comparing with a preset threshold, and it is determined whether the "ID card face" and the "self-portrait face" belong to the same person (e.g., distance above threshold→not the same person; and distance less or equal to threshold→the same person).

More details of the above processes are provided below.

Figure 2:
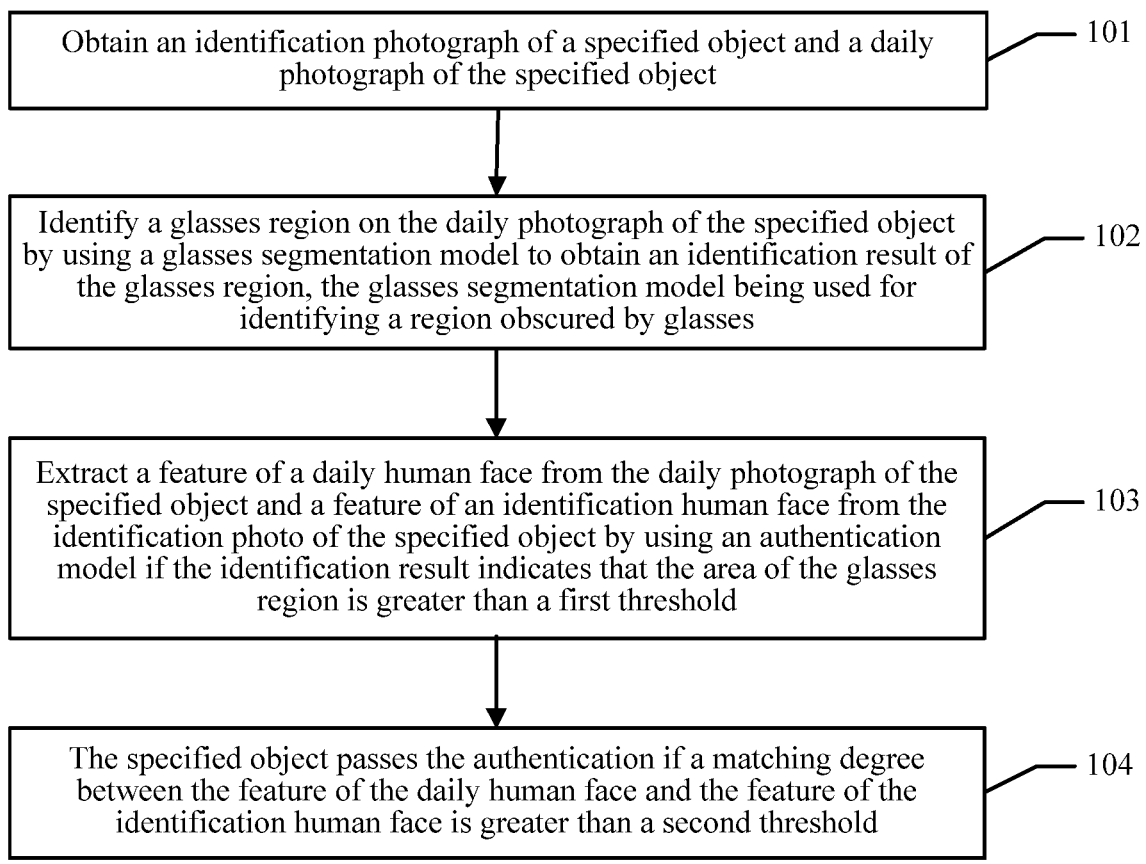
FIG. 2 is a schematic diagram of an embodiment of a human face authentication method according to an embodiment of this application.

A process of human face authentication performed by the server 30 on the identification photograph of the specified object and the daily photograph of the specified object may be understood by referring to FIG. 2. As shown in FIG. 2, an embodiment of a human face authentication method provided by an embodiment of this application includes:

101: Obtain an identification photograph of a specified object and a daily photograph of the specified object.

102: Identify a glasses region on the daily photograph of the specified object by using a glasses segmentation model to obtain an identification result of the glasses region, the glasses segmentation model being used for identifying a region obscured by glasses.

The server needs to identify a region to determine whether a person in the daily photograph of the specified object wears glasses. Parts of a human face under opaque parts such as a glasses frame, a glasses bracket, a nose pad are obscured, and strong reflected light caused by lenses may also lead to obscured regions on some parts of the human face. Therefore, the server may determine whether the person in the daily photograph wears glasses by identifying these regions that may be obscured by glasses.

Considering that a part surrounding eyes of a human face not wearing glasses may also be obscured because of another condition, however, usually, the area of the part that is obscured is not large when no glasses are worn. Therefore, a first threshold may be set in advance. When the obscured area is less than the first threshold, it may be considered that the person in the daily photograph does not wear glasses. If the obscured area is greater than the first threshold, it may be considered that the person in the daily photograph wears glasses.

A glasses segmentation model is needed in the process of identifying the glasses region. The glasses segmentation model is obtained by performing convolutional neural network (CNN) training on multiple daily photographs with marks of a human face with glasses, the daily photographs with marks of the human face with glasses marking the region obscured by glasses.

103: Extract a feature (e.g., features) of a daily human face (e.g., face in a non-ID photo) from the daily photograph of the specified object and a feature of an identification human face from the identification photo of the specified object by using an authentication model if the identification result indicates that the area of the glasses region is greater than a first threshold (e.g., 5% of the total number of pixels in the face region are occluded by glasses).

If the identification result indicates that the area of the glasses region is greater than a first threshold, it indicates that a person in the daily photograph wears glasses.

The authentication model in this embodiment of this application includes an identification-human face authentication model and an identification-glasses human face authentication model.

Because it is determined that the person in the daily photograph wears glasses, the identification-glasses human face authentication model needs to be used to extract the feature of the daily human face from the daily photograph of the specified object. Both the identification-human face authentication model and the identification-glasses human face authentication model can extract the feature of the identification human face. Therefore, either the identification-human face authentication model or the identification-glasses human face authentication model can be used.

The identification-human face authentication model is obtained by performing CNN training on multiple photographs of a daily human face not wearing glasses and an identification photograph of a human object in a collection of a same object. The collection of the same object is a collection of a human object corresponding to the photograph of the daily human face not wearing glasses.

The identification-glasses human face authentication model is obtained by performing feature regression CNN adjustment on the identification-human face authentication model by using a collection of photographs of a part that is obscured by the glasses region and a collection of features of the daily human face without glasses. The collection of photographs of a part that is obscured by the glasses region is obtained by comparing a collection of daily photographs without glasses with a collection of daily photographs with glasses, determining an obscured region corresponding to the glasses in each photograph of the collection of daily photographs without glasses, and obscuring the obscured region. The collection of features of the daily human face without glasses is obtained by extracting a feature of each photograph in the collection of daily photographs without glasses by using the identification-human face authentication model.

104: The specified object passes the authentication if a matching degree between the feature of the daily human face and the feature of the identification human face is greater than a second threshold.

The matching degree refers to a degree of similarity between the feature of the daily human face and the feature of the identification human face of the specified object. The degree of similarity may alternatively be similarity. The similarity may be calculated by using a Euclidean distance, a cos distance, a joint Bayesian method, or a metric learning method.

Compared with the problem that an identification photograph cannot be effectively compared with a photograph with glasses in the existing technology, in the human face authentication method provided by this embodiment of this application, a corresponding feature of a human face may be extracted from a photograph of a human face wearing glasses by using a corresponding authentication model, and be compared with a feature of a human face in an identification photograph, thereby effectively comparing an identification photograph with a photograph with glasses and improving the convenience of human face authentication.

The foregoing embodiment mentions the glasses segmentation model, the identification-human face authentication model, and the identification-glasses human face authentication model. The following describes training processes of the glasses segmentation model, the identification-human face authentication model, and the identification-glasses human face authentication model with reference to the accompanying drawings.

Figure 3:
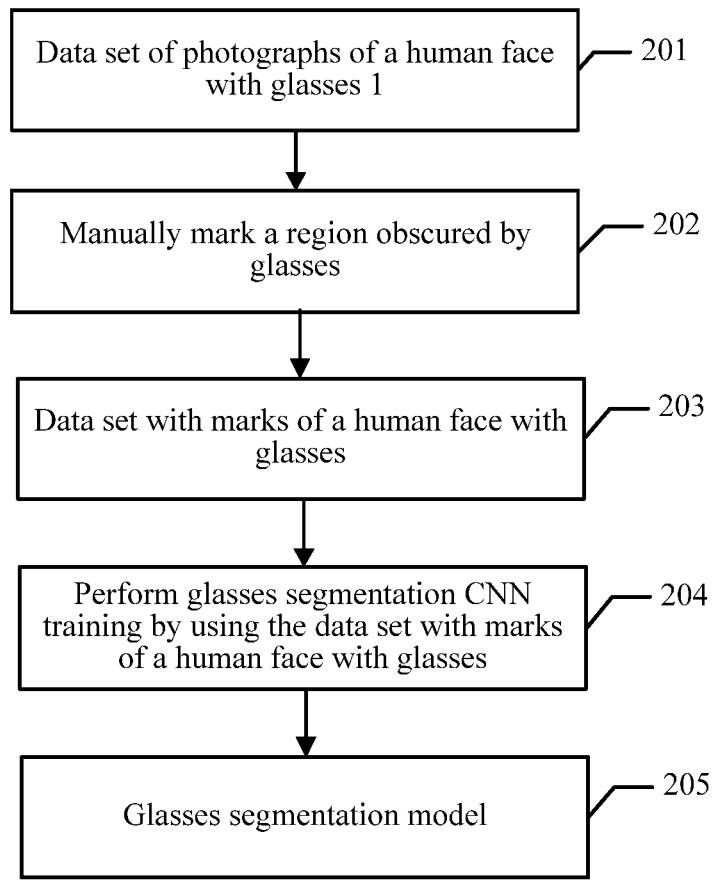
FIG. 3 is a schematic diagram of a process of generating a glasses segmentation model according to an embodiment of this application.

As shown in FIG. 3, FIG. 3 is a schematic diagram of a process of generating a glasses segmentation model according to an embodiment of this application.

201: Collect multiple different daily photographs of a human face of a person wearing glasses to construct a "data set of photographs of a human face with glasses 1".

202: Manually mark a region obscured by glasses on each human face photograph in the "data set of photographs of a human face with glasses 1".

The obscured region may include human face regions such as parts under opaque parts such as a glasses frame, a glasses bracket, a nose pad, and a human face region obscured resulted from strong reflected light caused by lenses.

203: Obtain a data set with marks of a human face with glasses through marking in step 202.

204: Perform glasses segmentation CNN training by using the "data set with marks of a human face with glasses".

The glasses segmentation CNN training process includes a convolution layer, a batch normalization layer, a deconvolution layer, and the like. A target of the training and optimization is to enable a quantity of error pixel of a segmentation result to be smaller than that of a marking result as far as possible. For a specific definition of the convolution layer, the batch normalization layer, and the deconvolution layer, and a CNN training manner, refer to a deep neural network training frame.

205: Obtain a glasses segmentation model through training in step 204.

The glasses segmentation model provided by this embodiment of this application provides possibility for identifying a daily photograph of a human face wearing glasses, thereby effectively comparing an identification photograph with a photograph with glasses and improving convenience of human face authentication.

Figure 4:
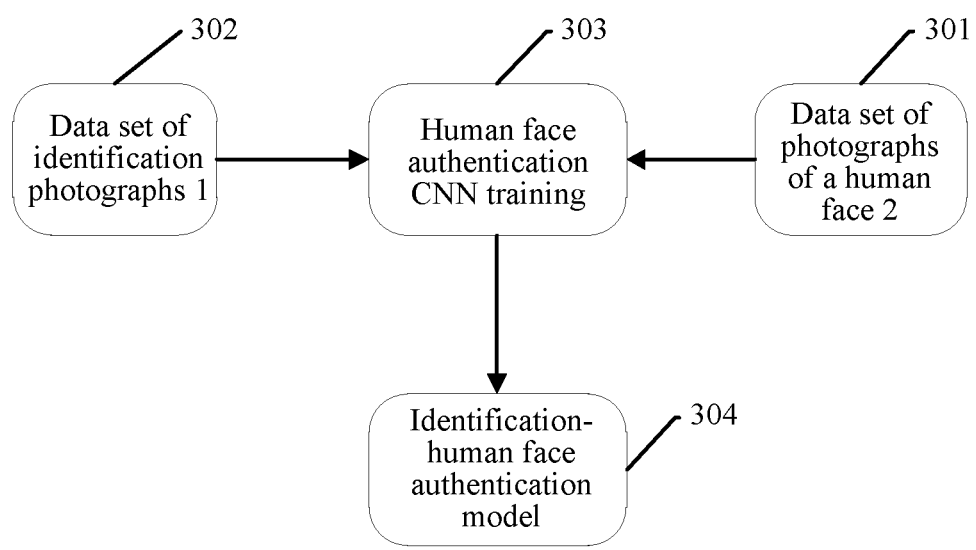
FIG. 4 is a schematic diagram of a process of generating an identification-human face authentication model according to an embodiment of this application.

The following describes the identification-human face authentication model in this embodiment of this application with reference to FIG. 4. As shown in FIG. 4, a process of generating the identification-human face authentication model may include:

301: Collect multiple photographs of a daily human face not wearing glasses to construct a "data set of photographs of a human face 2".

302: Collect identification photographs of a human face of a person in the photographs of the human face in the "data set of photographs of a human face 2" to construct a "data set of identification photographs 1".

303: Perform human face CNN training by using the "data set of identification photographs 1" and the "data set of photographs of a human face 2".

304: Obtain the identification-human face authentication model through CNN training in step 303.

The identification-human face authentication model provided by this embodiment of this application may identify an identification photograph and a photograph of a daily human face not wearing glasses. A photograph of a human face not wearing glasses may be quickly identified by using the identification-human face authentication model, thereby improving a photograph identification speed.

Figure 5:
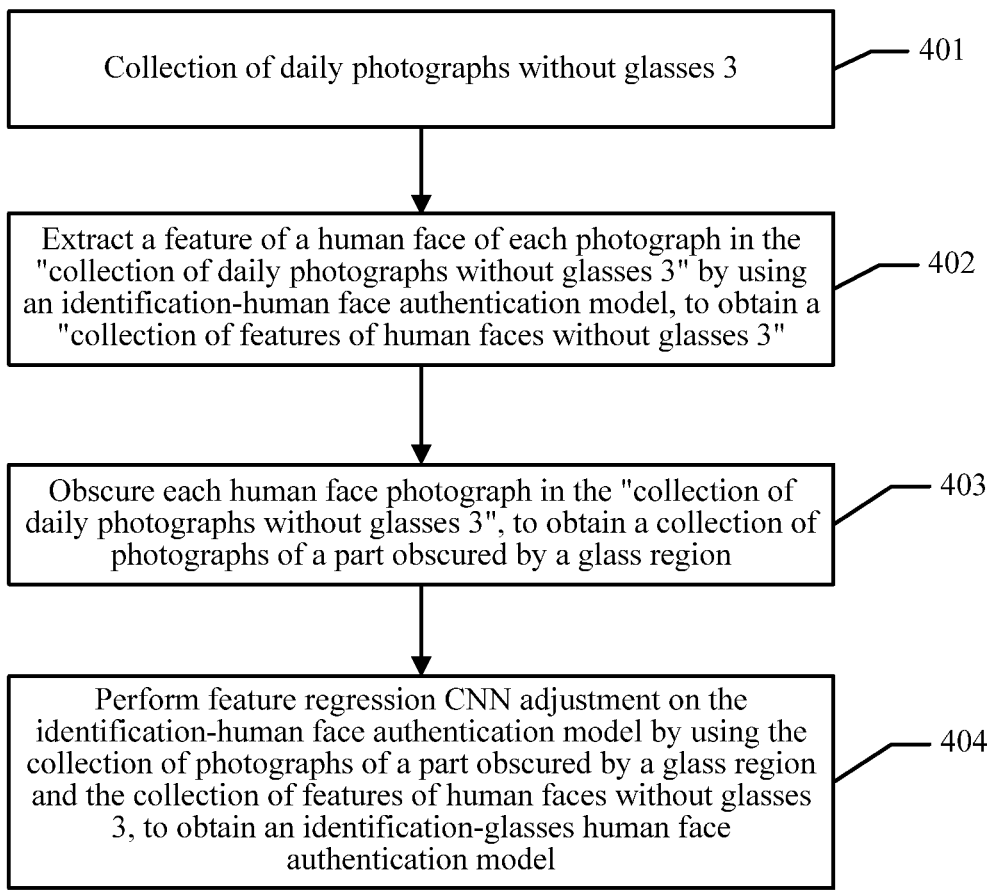
FIG. 5 is a schematic diagram of a process of generating an identification-glasses human face authentication model according to an embodiment of this application.

The following describes the identification-glasses human face authentication model in this embodiment of this application with reference to FIG. 5. As shown in FIG. 5, a process of generating the identification-glasses human face authentication model may include:

401: Collect multiple self-portrait photographs of human faces not wearing glasses of multiple persons to construct a "collection of daily photographs without glasses 3".

402: Extract a feature of a human face of each photograph in the "collection of daily photographs without glasses 3" by using an identification-human face authentication model, to obtain a "collection of features of daily human faces without glasses 3".

403: Obscure each human face photograph in the "collection of daily photographs without glasses 3", to obtain a collection of photographs of a part obscured by a glass region.

For a human face photograph A in the "collection of daily photographs without glasses 3", a human face photograph B of which a eyes position is close to that of the human face photograph A is found in the "data set of photographs of a human face with glasses 1". A region corresponding to a region that is obscured by glasses and that is manually marked in the human face photograph A and the human face photograph B is marked as C. A pixel at a position where C is located in the human face photograph A is set to a pixel of a pure grayscale with a grayscale value of 128.

An "obscuring and compositing" operation as above is performed on all photographs in the "collection of daily photographs without glasses 3", to obtain the collection of photographs of a part obscured by a glass region.

404: Perform "feature regression CNN adjustment" on the identification-human face authentication model by using the "collection of photographs of a part obscured by a glass region" and the "collection of features of daily human faces without glasses 3", to obtain the identification-glasses human face authentication model.

A process of the feature regression CNN adjustment is to extract a first feature of a human face from a human face photograph in the "collection of photographs of a part obscured by a glass region" by using the identification-human face authentication model, and extract a second feature of a human face from a human face photograph in the "collection of features of daily human faces without glasses 3" by using the identification-human face authentication model. A Euclidean distance between the first feature of a human face and the second feature of a human face is determined. The identification-human face authentication model is adjusted according to the Euclidean distance. For the adjusting process, the identification-human face authentication model may be micro-adjusted by using manners such as a convolution layer, a batch normalization layer, a deconvolution layer, and a deep neural network. A target of the adjustment is to enable the Euclidean distance between the first feature of a human face and the second feature of a human face extracted by using the identification-human face authentication model to be as small as possible. The adjusting process may be repeatedly. The identification-human face authentication model enabling the Euclidean distance between the first feature of a human face and the second feature of a human face to be smallest is the identification-glasses human face authentication model to be obtained.

The identification-glasses human face authentication model provided by this embodiment of this application may identify a photograph of a human face wearing glasses, thereby improving convenience of human face authentication.

To learn the process of generating the identification-glasses human face authentication model in this embodiment of this application more intuitively, the following provides further simple description with reference to FIG. 6.

As shown in FIG. 6, a "collection of daily photographs without glasses 3" 6A is constructed through collecting in step 401 in FIG. 5. Subsequently, a feature is extracted from the "collection of daily photographs without glasses 3" 6A by using the "identification-human face authentication model" 6B, to obtain a "collection of features of daily human faces without glasses 3" 6C. For a human face photograph A in the "collection of daily photographs without glasses 3" 6A, a human face photograph B of which a eyes position is close to that of the human face photograph A is found in the "data set of photographs of a human face with glasses 1" 6D. A region corresponding to a region that is obscured by glasses and that is manually marked in the human face photograph A and the human face photograph B is marked as C. A pixel at a position where C is located in the human face photograph A is set to a pixel of a pure grayscale with a grayscale value of 128. An "obscuring and compositing" operation as above is performed on all photographs in the "collection of daily photographs without glasses 3" 6A, to obtain the collection of photographs of a part obscured by a glass region 6E. 404: Perform "feature regression CNN adjustment" on the identification-human face authentication model by using the "collection of photographs of a part obscured by a glass region" 6E and the "collection of features of human faces without glasses 3" 6C, to obtain the "identification-glasses human face authentication model" 6F.

The foregoing is description of the processes of generating the models. After the foregoing models are generated, these models may be used to perform human face authentication.

Figure 7:
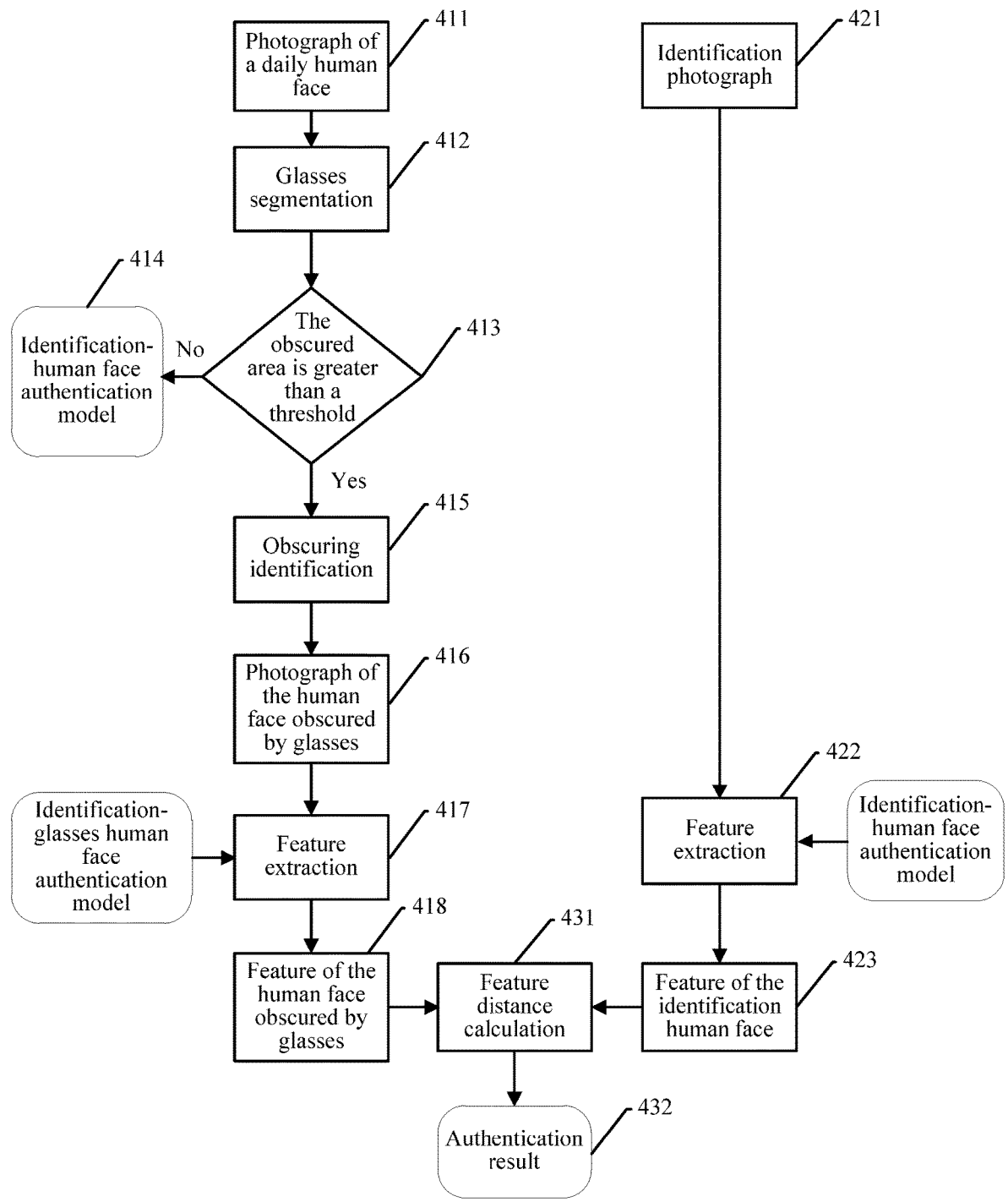
FIG. 7 is a schematic diagram of an embodiment of a human face authentication process according to an embodiment of this application.

A process of human face authentication may be understood by referring to FIG. 7. As shown in FIG. 7, an identification-human face authentication process provided by an embodiment of this application may include:

411: Obtain a daily photograph of a specified object.

412: Identify a glasses region on the daily photograph of the specified object by using a glasses segmentation model.

413: Determine whether the area obscured by glasses is greater than a threshold, and if it is determined that the area obscured by glasses is not greater than the threshold, perform step 414; or if it is determined that the area obscured by glasses is greater than the threshold, perform step 415.

414: It indicates that the specified object in the photograph does not wear glasses when the area obscured by glasses is not greater than the threshold, and the daily photograph is authenticated by using an identification-human face authentication model.

415: It indicates that the specified object in the photograph wears glasses when the area obscured by glasses is greater than the threshold, the glasses region in the daily photograph is obscured, and a obscuring identification is set.

416: Obtain a photograph of the human face obscured by glasses through obscuring in step 415.

417: Extract a feature from the photograph of the human face obscured by glasses by using an identification-glasses human face authentication model.

418: Obtain a feature of the human face obscured by glasses through feature extraction in step 417.

After the daily photograph of the specified object is processed by the foregoing steps 411 to 418, an identification photograph of the specified object is then processed.

421: Obtain an identification photograph of the specified object.

422: Extract a feature from the identification photograph of the specified object by using an identification-human face authentication model.

423: Obtain a feature of the identification human face through feature extraction in step 422.

After the feature of the identification human face is obtained by using steps 421 to 423, authentication is performed on the feature of the human face obscured by glasses and the feature of the identification human face, and the authentication steps may include:

431: Perform feature distance calculation on the feature of the human face obscured by glasses and the feature of the identification human face.

432: Obtain an authentication result through the feature distance calculation in step 431.

The authentication result may be that when the feature distance between the feature of the human face obscured by glasses and the feature of the identification human face is less than a preset threshold, the two features are considered to match with each other and the authentication succeeds; if the feature distance between the feature of the human face obscured by glasses and the feature of the identification human face is greater than the preset threshold, the two features are considered not to match with each other and the authentication fails.

In some embodiments, the extracting a feature of a daily human face from the daily photograph of the specified object and a feature of an identification human face from the identification photograph of the specified object by using an authentication model may include:

extracting a feature of a daily human face wearing glasses from the daily photograph by using an identification-glasses human face authentication model, the identification-glasses human face authentication model being used for extracting a feature of a human face from a photograph of a human face wearing glasses; and extracting the feature of the identification human face from the identification photograph of the specified object by using an identification-human face authentication model, the identification-human face authentication model being used for extracting a feature of a human face from a photograph of a human face not wearing glasses.

In this embodiment of this application, because a person in the identification photograph does not wear glasses, the feature may be extracted by using the identification-human face authentication model. Because the person in the daily photograph wears glasses, the feature of the human face in a photograph with glasses can be accurately extracted only when the identification-glasses human face authentication model is used to extract the feature. The process of extracting the features are basically the same, and only the used models are different. This ensures accuracy of extracting a feature from a photograph with glasses.

In some embodiments, the extracting a feature of a daily human face wearing glasses from the daily photograph by using an identification-glasses human face authentication model may include:

modifying a pixel value of the glasses region indicated by the identification result, to obtain a daily photograph of a part that is obscured by the glasses region; and extracting the feature of the daily human face wearing glasses from the daily photograph of the part that is obscured by the glasses region by using the identification-glasses human face authentication model.

In this embodiment of this application, the modifying a pixel value of the glasses region indicated by the identification result may include setting the pixel value of the glasses region to a grayscale value of 128.

The following describes a human face authentication apparatus 50 in an embodiment of this application with reference to the accompanying drawings. The human face authentication apparatus 50 in this embodiment of this application may the server shown in FIG. 1, or may be a function module in the server.

Figure 8:
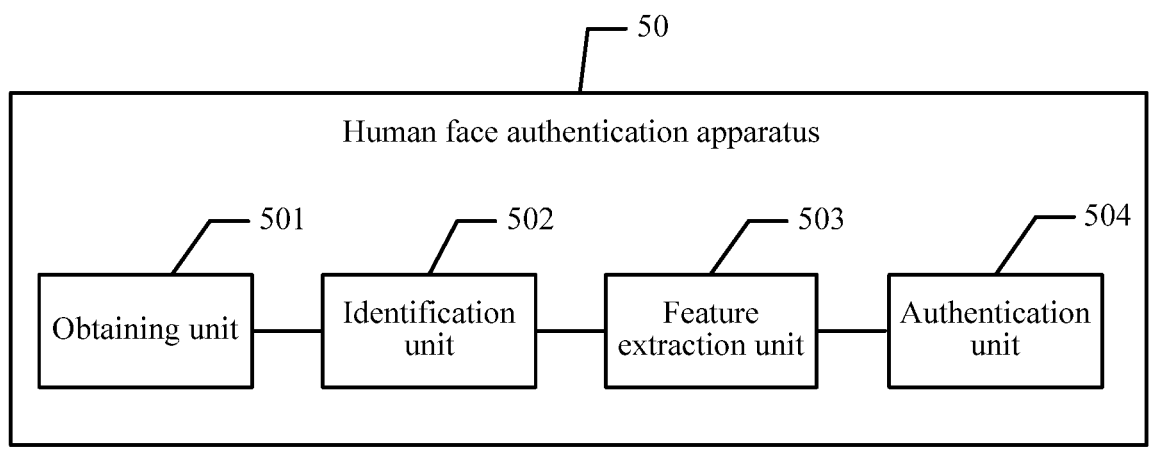
FIG. 8 is a schematic diagram of an embodiment of a human face authentication apparatus according to an embodiment of this application.

As shown in FIG. 8, an embodiment of the human face authentication apparatus 50 provided by this embodiment of this application includes:

an obtaining unit 501, configured to obtain an identification photograph of a specified object and a daily photograph of the specified object;

an identification unit 502, configured to identify a glasses region on the daily photograph of the specified object obtained by the obtaining unit 501 by using a glasses segmentation model to obtain an identification result of the glasses region, the glasses segmentation model being used for identifying a region obscured by glasses;

a feature extraction unit 503, configured to extract a feature of a daily human face from the daily photograph of the specified object and a feature of an identification human face from the identification photograph of the specified object by using an authentication model if the identification result obtained by the identification unit 502 indicates that the area of the glasses region is greater than a first threshold; and an authentication unit 504, configured to authenticate the feature of the daily human face and the feature of the identification human face extracted by the feature extraction unit 503, and it is determined that the specified object passes the authentication if a matching degree between the feature of the daily human face and the feature of the identification human face is greater than a second threshold.

In this embodiment of this application, the obtaining unit 501 obtains the identification photograph of the specified object and the daily photograph of the specified object; the identification unit 502 identifies the glasses region on the daily photograph of the specified object obtained by the obtaining unit 501 by using the glasses segmentation model to obtain the identification result of the glasses region, the glasses segmentation model being used for identifying a region obscured by glasses; the feature extraction unit 503 extracts the feature of the daily human face from the daily photograph of the specified object and the feature of the identification human face from the identification photograph of the specified object by using the authentication model if the identification result obtained by the identification unit 502 indicates that the area of the glasses region is greater than the first threshold; and the authentication unit 504 authenticates the feature of the daily human face and the feature of the identification human face extracted by the feature extraction unit 503, and it is determined that the specified object passes the authentication if a matching degree between the feature of the daily human face and the feature of the identification human face is greater than a second threshold. Compared with the problem that an identification photograph cannot be effectively compared with a photograph with glasses in the existing technology, the human face authentication apparatus provided by this embodiment of this application may extract a corresponding feature of a human face from a photograph of a human face wearing glasses by using a corresponding authentication model, and compare the feature of the human face wearing glasses with a feature of a human face in an identification photograph, thereby effectively comparing an identification photograph with a photograph with glasses and improving the convenience of human face authentication.

In some embodiments, the feature extraction unit 503 is configured to:

extract a feature of a daily human face wearing glasses from the daily photograph by using an identification-glasses human face authentication model, the identification-glasses human face authentication model being used for extracting a feature of a human face from a photograph of a human face wearing glasses; and extract the feature of the identification human face from the identification photograph of the specified object by using an identification-human face authentication model, the identification-human face authentication model being used for extracting a feature of a human face from a photograph of a human face not wearing glasses.

In some embodiments, the feature extraction unit 503 is configured to:

modify a pixel value of the glasses region indicated by the identification result, to obtain a daily photograph of a part that is obscured by the glasses region; and extract the feature of the daily human face wearing glasses from the daily photograph of the part that is obscured by the glasses region by using the identification-glasses human face authentication model.

In some embodiments, the glasses segmentation model is obtained by performing CNN training on multiple daily photographs with marks of a human face with glasses, and the daily photographs with marks of the human face with glasses marks the region obscured by glasses.

In some embodiments, the identification-human face authentication model is obtained by performing CNN training on multiple photographs of a daily human face not wearing glasses and an identification photograph of a human object in a collection of a same object. The collection of the same object is a collection of a human object corresponding to the photograph of the daily human face not wearing glasses.

In some embodiments, the identification-glasses human face authentication model is obtained by performing feature regression CNN adjustment on the identification-human face authentication model by using a collection of photographs of a part that is obscured by the glasses region and a collection of features of the daily human face without glasses. The collection of photographs of a part that is obscured by the glasses region is obtained by comparing a collection of daily photographs without glasses with a collection of daily photographs with glasses, determining an obscured region corresponding to the glasses in each photograph of the collection of daily photographs without glasses, and obscuring the obscured region. The collection of features of the daily human face without glasses is obtained by extracting a feature of each photograph in the collection of daily photographs without glasses by using the identification-human face authentication model.

The human face authentication apparatus 50 provided by this embodiment of this application may be understood by referring to corresponding descriptions in FIG. 1 to FIG. 7, and no details are further provided herein.

Figure 9:
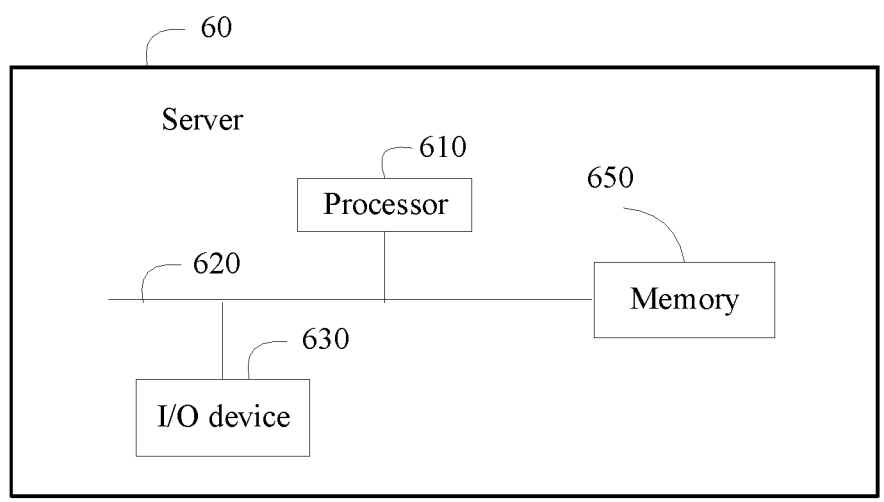
FIG. 9 is a schematic diagram of an embodiment of a server according to an embodiment of this application.

FIG. 9 is a schematic structural diagram of a server 60 according to an embodiment of this application. The server 60 is applied to a human face authentication system. The human face authentication system includes the image collector shown in FIG. 1 and the server 60. The server 60 includes one or more processors 610, a memory 650, and an input/output device 630. The memory 650 may include a read-only memory and a random access memory, and provides operation instructions and data for the processor 610. A part of the memory 650 may further include a non-volatile random access memory (NVRAM).

In some implementations, the memory 650 stores the following elements: an executable module or a data structure, or a subset thereof, or an extension set thereof.

In this embodiment of this application, by invoking the operating instruction (the operating instruction may be stored in an operating system) stored by the memory 650, the processor 610 is configured to:

obtain an identification photograph of a specified object and a daily photograph of the specified object;

identify a glasses region on the daily photograph of the specified object by using a glasses segmentation model to obtain an identification result of the glasses region, the glasses segmentation model being used for identifying a region obscured by glasses;

extract a feature of a daily human face from the daily photograph of the specified object and a feature of an identification human face from the identification photograph of the specified object by using an authentication model if the identification result indicates that the area of the glasses region is greater than a first threshold; and pass, by the specified object, the authentication if a matching degree between the feature of the daily human face and the feature of the identification human face is greater than a second threshold.

Compared with the problem that an identification photograph cannot be effectively compared with a photograph with glasses in the existing technology, the server provided by this embodiment of this application may extract a corresponding feature of a human face from a photograph of a human face wearing glasses by using a corresponding authentication model, and compare the feature of the human face wearing glasses with a feature of a human face in an identification photograph, thereby effectively comparing an identification photograph with a photograph with glasses and improving the convenience of human face authentication.

The processor 610 controls an operation of the server 60, and the processor 610 may also be referred to as a central processing unit (CPU). The memory 650 may include a read-only memory and a random access memory, and provides instructions and data to the processor 610. A part of the memory 650 may further include an NVRAM. In a specific application, all components of the server 60 are coupled by using a bus system 620, and in addition to a data bus, the bus system 620 may further include a power source bus, a control bus, a state signal bus, and the like. However, for ease of clear description, all types of buses in the diagram are marked as the bus system 620.

The method disclosed in the foregoing embodiments of this application may be applied to the processor 610, or may be implemented by the processor 610. The processor 610 may be an integrated circuit chip and has a signal processing capability. In an implementation process, steps in the foregoing method may be implemented through a hardware integrated logical circuit in the processor 610, or an instruction in the form of software. The processor 610 may be a general-purpose processor, a digital signal processor (DSP), an application-specific integrated circuit (ASIC), a field programmable gate array (FPGA), another programmable logic component, a discrete gate or a transistor logic device, or a discrete hardware component, and may implement or execute methods, steps, and logical block diagrams disclosed in the embodiments of this application. The general-purpose processor may be a micro-processor, or the processor may also be any conventional processor or the like. The steps in the methods disclosed in the embodiments of this application may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 650, and the processor 610 reads information in the memory 650 and performs the steps of the foregoing method in combination with hardware of the processor.

In some embodiments, the processor 610 is further configured to:
 extract a feature of a daily human face wearing glasses from the daily photograph by using an identification-glasses human face authentication model, the identification-glasses human face authentication model being used for extracting a feature of a human face from a photograph of a human face wearing glasses; and
 extract the feature of the identification human face from the identification photograph of the specified object by using an identification-human face authentication model, the identification-human face authentication model being used for extracting a feature of a human face from a photograph of a human face not wearing glasses.

In some embodiments, the processor 610 is further configured to:
 modify a pixel value of the glasses region indicated by the identification result, to obtain a daily photograph of a part that is obscured by the glasses region; and
 extract the feature of the daily human face wearing glasses from the daily photograph of the part that is obscured by the glasses region by using the identification-glasses human face authentication model.

In some embodiments, the glasses segmentation model is obtained by performing CNN training on multiple daily photographs with marks of a human face with glasses, and the daily photographs with marks of the human face with glasses marks the region obscured by glasses.

In some embodiments, the identification-human face authentication model is obtained by performing CNN training on multiple photographs of a daily human face not wearing glasses and an identification photograph of a human object in a collection of a same object. The collection of the same object is a collection of a human object corresponding to the photograph of the daily human face not wearing glasses.

In some embodiments, the identification-glasses human face authentication model is obtained by performing feature regression CNN adjustment on the identification-human face authentication model by using a collection of photographs of a part that is obscured by the glasses region and a collection of features of the daily human face without glasses. The collection of photographs of a part that is obscured by the glasses region is obtained by comparing a collection of daily photographs without glasses with a collection of daily photographs with glasses, determining an obscured region corresponding to the glasses in each photograph of the collection of daily photographs without glasses, and obscuring the obscured region. The collection of features of the daily human face without glasses is obtained by extracting a feature of each photograph in the collection of daily photographs without glasses by using the identification-human face authentication model.

The server described in the foregoing FIG. 9 may be understood by referring to corresponding descriptions in FIG. 1 to FIG. 8, and no details are further provided herein.

A person of ordinary skill in the art may understand that all or some of the steps of the methods in the embodiments may be implemented by executing a program instruction corresponding to the method by using hardware. The program instruction may be stored in a computer readable storage medium. The storage medium may include a ROM, a RAM, a magnetic disk, an optical disc, or the like.

The human face authentication method and apparatus provided by the embodiments of this application are described in detail in the foregoing, and the text applies specific examples to describe the principle and implementations of this application. The foregoing descriptions of the embodiments are only intended to help understand the method and core idea of this application. Meanwhile, to a person of ordinary skill in the art, changes can be made on the specific implementations and application range according to the idea of this application. In conclusion, the content of the specification should not be construed as a limit to this application.

What is claimed is:
1. A human face authentication method, comprising:
 at a computing device having one or more processors and memory:
  receiving an image-based authentication request from a specified object for a respective transaction, the specified object being a human user; and
  in response to receiving the image-based authentication request:
   obtaining an identification photograph of a specified object and a daily photograph of the specified object, wherein the identification photograph of the specified object and the daily photograph of the specified object each include a region corresponding to a human face;
   designating a glasses region on the daily photograph of the specified object by using a glasses segmentation model, wherein the glasses segmentation model has been trained to label pixels in the daily photograph that correspond to regions of the human face in the daily photograph that are obscured by glasses;
   in accordance with a determination that the regions of the human face in the daily photograph that are labeled as being obscured by glasses exceed a first threshold amount, modifying the daily photograph by changing pixel values of the regions of the human face in the daily photograph that are labeled as being obscured by glasses;
   in accordance with a determination that the regions of the human face in the daily photograph that are labeled as being obscured by glasses do not exceed the first threshold amount, forgoing modifying the daily photograph by changing the pixel values of the regions of the human face in the daily photograph that are labeled as being obscured by glasses;

extracting features of a daily human face from the daily photograph of the specified object and features of an identification human face from the identification photograph of the specified object by using a respective authentication model depending on whether the daily photograph has been modified; and approving the authentication request in accordance with a determination that a matching degree between the features of the daily human face and the features of the identification human face is greater than a second threshold amount.

2. The method according to claim 1, wherein the extracting features of a daily human face from the daily photograph of the specified object and features of an identification human face from the identification photograph of the specified object by using a respective authentication model depending on whether the daily photograph has been modified includes:

in accordance with a determination that the daily photograph has been modified:

extracting features of a daily human face wearing glasses from the daily photograph by using an identification-glasses human face authentication model, the identification-glasses human face authentication model having been trained for extracting features of a human face from a photograph of a human face wearing glasses; and extracting features of an identification human face from the identification photograph of the specified object by using an identification-human face authentication model, the identification-human face authentication model having been trained for extracting features of a human face from a photograph of a human face not wearing glasses.

3. The method according to claim 2, wherein the extracting features of a daily human face wearing glasses from the daily photograph by using an identification-glasses human face authentication model comprises:

after changing the pixel values of the regions of the human face in the daily photograph that are labeled as being obscured by glasses, to obtain a modified daily photograph; and extracting the features of the daily human face wearing glasses from the modified daily photograph by using the identification-glasses human face authentication model.

4. The method according to claim 2, wherein the glasses segmentation model is obtained by performing convolutional neural network (CNN) training on multiple daily photographs each being marked with regions of a human face obscured with glasses.

5. The method according to claim 4, wherein the identification-human face authentication model is obtained by performing CNN training on multiple pairs of photographs each including a daily human face not wearing glasses of a human object and an identification photograph of a corresponding human object.

6. The method according to claim 5, wherein the identification-glasses human face authentication model is obtained by performing feature regression CNN adjustment on the identification-human face authentication model by using a collection of photographs each including regions of a human face that are obscured by glasses and a collection of features of the daily human face without glasses.

7. The method according to claim 6, wherein the collection of photographs each including regions of a human face that are obscured by glasses are obtained based on a comparison between photographs of a collection of daily photographs without glasses and photographs of a collection of daily photographs with glasses, wherein the regions obscured by glasses in each photograph of the collection of daily photographs with glasses are obtained based on the comparison, and features of the daily human face without glasses are obtained by extracting features from each photograph in the collection of daily photographs without glasses using the identification-human face authentication model.

8. A device, comprising:
one or more processors;
memory;
a display; and
a plurality of instructions stored in the memory that, when executed by the one or more processors, cause the one or more processors to perform the following operations:

receiving an image-based authentication request from a specified object for a respective transaction, the specified object being a human user; and in response to receiving the image-based authentication request:

obtaining an identification photograph of a specified object and a daily photograph of the specified object, wherein the identification photograph of the specified object and the daily photograph of the specified object each include a region corresponding to a human face;

designating a glasses region on the daily photograph of the specified object by using a glasses segmentation model, wherein the glasses segmentation model has been trained to label pixels in the daily photograph that correspond to regions of the human face in the daily photograph that are obscured by glasses;

in accordance with a determination that the regions of the human face in the daily photograph that are labeled as being obscured by glasses exceed a first threshold amount, modifying the daily photograph by changing pixel values of the regions of the human face in the daily photograph that are labeled as being obscured by glasses;

in accordance with a determination that the regions of the human face in the daily photograph that are labeled as being obscured by glasses do not exceed the first threshold amount, forgoing modifying the daily photograph by changing the pixel values of the regions of the human face in the daily photograph that are labeled as being obscured by glasses;

extracting features of a daily human face from the daily photograph of the specified object and features of an identification human face from the identification photograph of the specified object by using a respective authentication model depending on whether the daily photograph has been modified; and approving the authentication request in accordance with a determination that a matching degree between the features of the daily human face and the features of the identification human face is greater than a second threshold amount.

9. The device according to claim 8, wherein the extracting features of a daily human face from the daily photograph of the specified object and features of an identification human face from the identification photograph of the specified object by using a respective authentication model depending on whether the daily photograph has been modified includes:
in accordance with a determination that the daily photograph has been modified:
extracting features of a daily human face wearing glasses from the daily photograph by using an identification-glasses human face authentication model, the identification-glasses human face authentication model having been trained for extracting features of a human face from a photograph of a human face wearing glasses; and
extracting features of an identification human face from the identification photograph of the specified object by using an identification-human face authentication model, the identification-human face authentication model having been trained for extracting features of a human face from a photograph of a human face not wearing glasses.

10. The device according to claim 9, wherein the extracting features of a daily human face wearing glasses from the daily photograph by using an identification-glasses human face authentication model comprises:
after changing the pixel values of the regions of the human face in the daily photograph that are labeled as being obscured by glasses, to obtain a modified daily photograph; and
extracting the features of the daily human face wearing glasses from the modified daily photograph by using the identification-glasses human face authentication model.

11. The device according to claim 9, wherein the glasses segmentation model is obtained by performing convolutional neural network (CNN) training on multiple daily photographs each being marked with regions of a human face obscured with glasses.

12. The device according to claim 11, wherein the identification-human face authentication model is obtained by performing CNN training on multiple pairs of photographs each including a daily human face not wearing glasses of a human object and an identification photograph of a corresponding human object.

13. The device according to claim 12, wherein the identification-glasses human face authentication model is obtained by performing feature regression CNN adjustment on the identification-human face authentication model by using a collection of photographs each including regions of a human face that are obscured by glasses and a collection of features of the daily human face without glasses.

14. The device according to claim 13, wherein the collection of photographs each including regions of a human face that are obscured by glasses are obtained based on a comparison between photographs of a collection of daily photographs without glasses and photographs of a collection of daily photographs with glasses, wherein the regions obscured by glasses in each photograph of the collection of daily photographs with glasses are obtained based on the comparison, and features of the daily human face without glasses are obtained by extracting features from each photograph in the collection of daily photographs without glasses using the identification-human face authentication model.

15. A non-transitory computer-readable storage medium storing a plurality of instructions configured for execution by a device having one or more processors and a display, wherein the plurality of instructions cause the device to perform the following operations:
receiving an image-based authentication request from a specified object for a respective transaction, the specified object being a human user; and
in response to receiving the image-based authentication request:
obtaining an identification photograph of a specified object and a daily photograph of the specified object, wherein the identification photograph of the specified object and the daily photograph of the specified object each include a region corresponding to a human face;
designating a glasses region on the daily photograph of the specified object by using a glasses segmentation model, wherein the glasses segmentation model has been trained to label pixels in the daily photograph that correspond to regions of the human face in the daily photograph that are obscured by glasses;
in accordance with a determination that the regions of the human face in the daily photograph that are labeled as being obscured by glasses exceed a first threshold amount, modifying the daily photograph by changing pixel values of the regions of the human face in the daily photograph that are labeled as being obscured by glasses;
in accordance with a determination that the regions of the human face in the daily photograph that are labeled as being obscured by glasses do not exceed the first threshold amount, forgoing modifying the daily photograph by changing the pixel values of the regions of the human face in the daily photograph that are labeled as being obscured by glasses;
extracting features of a daily human face from the daily photograph of the specified object and features of an identification human face from the identification photograph of the specified object by using a respective authentication model depending on whether the daily photograph has been modified; and
approving the authentication request in accordance with a determination that a matching degree between the features of the daily human face and the features of the identification human face is greater than a second threshold amount.

16. The computer-readable storage medium according to claim 15, wherein the extracting features of a daily human face from the daily photograph of the specified object and features of an identification human face from the identification photograph of the specified object by using a respective authentication model depending on whether the daily photograph has been modified includes:
in accordance with a determination that the daily photograph has been modified:
extracting features of a daily human face wearing glasses from the daily photograph by using an identification-glasses human face authentication model, the identification-glasses human face authentication model having been trained for extracting features of a human face from a photograph of a human face wearing glasses; and
extracting features of an identification human face from the identification photograph of the specified object by using an identification-human face authentication model, the identification-human face authentication model having been trained for extracting features of a human face from a photograph of a human face not wearing glasses.

17. The computer-readable storage medium according to claim 16, wherein the extracting features of a daily human face wearing glasses from the daily photograph by using an identification-glasses human face authentication model comprises:

after changing the pixel values of the regions of the human face in the daily photograph that are labeled as being obscured by glasses, to obtain a modified daily photograph; and extracting the features of the daily human face wearing glasses from the modified daily photograph by using the identification-glasses human face authentication model.

18. The computer-readable storage medium according to claim 16, wherein the glasses segmentation model is obtained by performing convolutional neural network (CNN) training on multiple daily photographs each being marked with regions of a human face obscured with glasses.

19. The computer-readable storage medium according to claim 18, wherein the identification-human face authentication model is obtained by performing CNN training on multiple pairs of photographs each including a daily human face not wearing glasses of a human object and an identification photograph of a corresponding human object.

20. The computer-readable storage medium according to claim 19, wherein the identification-glasses human face authentication model is obtained by performing feature regression CNN adjustment on the identification-human face authentication model by using a collection of photographs each including regions of a human face that are obscured by glasses and a collection of features of the daily human face without glasses.

* * * * *